US012756252B2

(12) United States Patent
Matsuda et al.

(10) Patent No.: US 12,756,252 B2
(45) Date of Patent: Oct. 6, 2026

(54) ROTOR, ROTARY ELECTRIC MACHINE, AND DRIVE DEVICE

(71) Applicant: NIDEC CORPORATION, Kyoto (JP)

(72) Inventors: Kazutoshi Matsuda, Kyoto (JP); Tomoya Ueda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 177 days.

(21) Appl. No.: 18/852,598

(22) PCT Filed: Mar. 24, 2023

(86) PCT No.: PCT/JP2023/011845
§ 371 (c)(1),
(2) Date: Sep. 30, 2024

(87) PCT Pub. No.: WO2023/190172
PCT Pub. Date: Oct. 5, 2023

(65) Prior Publication Data

US 2025/0226712 A1 Jul. 10, 2025

(30) Foreign Application Priority Data

Mar. 31, 2022 (JP) ................................ 2022-059199

(51) Int. Cl.
*H02K 1/32* (2006.01)
*H02K 1/276* (2022.01)
(Continued)

(52) U.S. Cl.
CPC ............... *H02K 1/32* (2013.01); *H02K 1/276* (2013.01); *H02K 1/30* (2013.01); *H02K 7/116* (2013.01); *H02K 9/19* (2013.01); *H02K 2201/06* (2013.01)

(58) Field of Classification Search
CPC H02K 1/27; H02K 1/276; H02K 1/30; H02K 1/32; H02K 7/116; H02K 9/19; H02K 2201/06
(Continued)

(56) References Cited

U.S. PATENT DOCUMENTS 11,056,941 B2 7/2021 Matsumoto
2019/0173344 A1* 6/2019 Ishikawa ................. H02K 1/32
(Continued)

FOREIGN PATENT DOCUMENTS

JP S54090616 U 6/1979
JP 2011217443 A 10/2011
(Continued)

OTHER PUBLICATIONS

International Search Report in PCT/JP2023/011845, mailed Jun. 13, 2023. 4pp.

*Primary Examiner* — Rashad H Johnson
(74) *Attorney, Agent, or Firm* — HAUPTMAN HAM, LLP

(57) ABSTRACT

A rotor according to an aspect of the present invention includes a shaft including: a first shaft hole extending in an axial direction; and a second shaft hole extending radially outward from the first shaft hole and opening to an outer peripheral surface of the shaft. A rotor core includes a plurality of core holes extending in the axial direction and disposed at intervals in a circumferential direction. A plate includes a through-hole overlapping the core hole when viewed in the axial direction, and a flow path connecting the second shaft hole and the through-hole. The plate has an outer edge away from a central axis by a second distance that is shorter than a first distance from the central axis to an outer edge of the rotor core.

11 Claims, 7 Drawing Sheets

(51) Int. Cl.
*H02K 1/30* (2006.01)
*H02K 7/116* (2006.01)
*H02K 9/19* (2006.01)

(58) Field of Classification Search
USPC .......................................... 310/52, 54, 58, 64
See application file for complete search history.

(56) References Cited

U.S. PATENT DOCUMENTS

| | | | | |
|---|---|---|---|---|
| 2019/0173352 | A1* | 6/2019 | Yamaguchi | H02K 9/19 |
| 2019/0173359 | A1* | 6/2019 | Ishikawa | H02K 1/32 |
| 2019/0178365 | A1* | 6/2019 | Ishikawa | F16H 57/0493 |
| 2019/0181708 | A1* | 6/2019 | Maekawa | H02K 1/2766 |
| 2020/0266687 | A1* | 8/2020 | Nakamatsu | B60K 1/00 |
| 2021/0288550 | A1* | 9/2021 | Ishikawa | H02K 7/1815 |
| 2022/0123628 | A1* | 4/2022 | Nakamatsu | H02K 5/20 |
| 2022/0158522 | A1* | 5/2022 | Ishikawa | H02K 5/203 |
| 2022/0158523 | A1* | 5/2022 | Ishikawa | F16H 57/0476 |
| 2022/0271602 | A1* | 8/2022 | Makino | H02K 5/10 |
| 2022/0271614 | A1* | 8/2022 | Makino | H02K 11/40 |
| 2022/0271628 | A1* | 8/2022 | Miki | H02K 11/25 |
| 2022/0281310 | A1* | 9/2022 | Nakata | F16H 57/045 |
| 2022/0286016 | A1* | 9/2022 | Nakata | H02K 9/193 |
| 2022/0286025 | A1* | 9/2022 | Kuroyanagi | H02K 9/19 |
| 2022/0294317 | A1* | 9/2022 | Nakamura | H02K 5/04 |
| 2022/0305892 | A1* | 9/2022 | Ishikawa | B60K 1/00 |
| 2022/0307586 | A1* | 9/2022 | Fujimoto | F16H 57/0424 |
| 2023/0068403 | A1* | 3/2023 | Matsuzaki | H02K 1/2766 |
| 2023/0093962 | A1* | 3/2023 | Danh | H02K 11/40<br>310/90 |
| 2023/0132520 | A1* | 5/2023 | Nakata | H02K 7/116<br>310/90 |
| 2023/0137429 | A1* | 5/2023 | Nakata | H02K 9/19<br>310/54 |
| 2023/0139180 | A1* | 5/2023 | Ishikawa | H02K 9/19<br>310/54 |
| 2023/0261542 | A1* | 8/2023 | Yamaguchi | F16H 57/0421<br>310/54 |
| 2023/0412019 | A1* | 12/2023 | Makino | H02K 1/32 |
| 2024/0213833 | A1* | 6/2024 | Yamasaki | H02K 1/276 |
| 2024/0213837 | A1* | 6/2024 | Matsuda | H02K 1/32 |
| 2024/0213838 | A1* | 6/2024 | Yamasaki | H02K 1/276 |
| 2024/0258855 | A1* | 8/2024 | Niwa | H02K 1/30 |
| 2024/0322624 | A1* | 9/2024 | Takahata | H02K 1/32 |
| 2024/0388152 | A1* | 11/2024 | Kawato | H02K 7/003 |
| 2025/0337290 | A1* | 10/2025 | Arao | H02K 1/14 |
| 2025/0373102 | A1* | 12/2025 | Wu | H02K 3/12 |
| 2026/0066723 | A1* | 3/2026 | Tanaka | H02K 1/2766 |

FOREIGN PATENT DOCUMENTS

| | | | |
|---|---|---|---|
| JP | 2014155243 | A | 8/2014 |
| JP | 2019161750 | A | 9/2019 |
| JP | 2021177675 | A | 11/2021 |

* cited by examiner

ROTOR, ROTARY ELECTRIC MACHINE, AND DRIVE DEVICE

CROSS-REFERENCE TO RELATED APPLICATIONS

This is the U.S. national stage of application No. PCT/JP2023/011845, filed on Mar. 24, 2023, and priority under 35 U.S.C. § 119 (a) and 35 U.S.C. § 365 (b) is claimed from Japanese Patent Application No. 2022-059199, filed on Mar. 31, 2022.

FIELD OF THE INVENTION

The present invention relates to a rotor, a rotary electric machine, and a drive device.

This application is based on JP 2022-059199 A filed on Mar. 31, 2022. This application claims the benefit of priority over the application. The entire content thereof is incorporated herein by reference.

BACKGROUND

A rotary electric machine is known in which a rotor shaft is provided with a refrigerant flow path through which a refrigerant is supplied and a refrigerant supply part that supplies the refrigerant to a rotor core. For example, conventionally, there is a rotary electric machine including a refrigerant distribution plate provided with a connection flow path connecting a refrigerant supply part of a rotor shaft and a plurality of intra-core flow paths extending in an axial direction inside a rotor core.

The rotary electric machine as described above includes a rotor core and a pair of end plates each of which is provided with a refrigerant distribution plate made of an insulating material and in a disk shape with outer dimension equal to corresponding one of the rotor core and the pair of end plates to prevent eddy current loss from occurring. However, even when the insulating material is used for the refrigerant distribution plate, the eddy current loss of a rotor may increase to reduce motor efficiency when the insulating material has a small electric resistance value.

SUMMARY

An aspect of the present invention is a rotor provided in a motor, the rotor including: a shaft extending in an axial direction about a central axis; a rotor core including a plurality of core pieces disposed side by side in the axial direction and fixed to an outer peripheral surface of the shaft; and a plate made of a non-magnetic metal material disposed between the core pieces adjacent to each other in the axial direction and surrounding the shaft. The shaft includes a first shaft hole extending in the axial direction and a second shaft hole extending radially outward from the first shaft hole and opening to an outer peripheral surface of the shaft. The rotor core includes a plurality of core holes extending in the axial direction and disposed at intervals in a circumferential direction. The plate includes a through hole overlapping the core hole when viewed in the axial direction, and a flow path connecting the second shaft hole and the through hole. The plate has an outer edge away from the central axis by a second distance that is shorter than a first distance from the central axis to an outer edge of the rotor core.

An aspect of a rotary electric machine according to the present invention includes the rotor described above, and a stator that faces the rotor with a gap therebetween.

An aspect of a drive device according to the present invention includes the rotary electric machine described above, and a gear mechanism connected to the rotary electric machine.

The above and other elements, features, steps, characteristics and advantages of the present disclosure will become more apparent from the following detailed description of the preferred embodiments with reference to the attached drawings.

DETAILED DESCRIPTION

Figure 1:
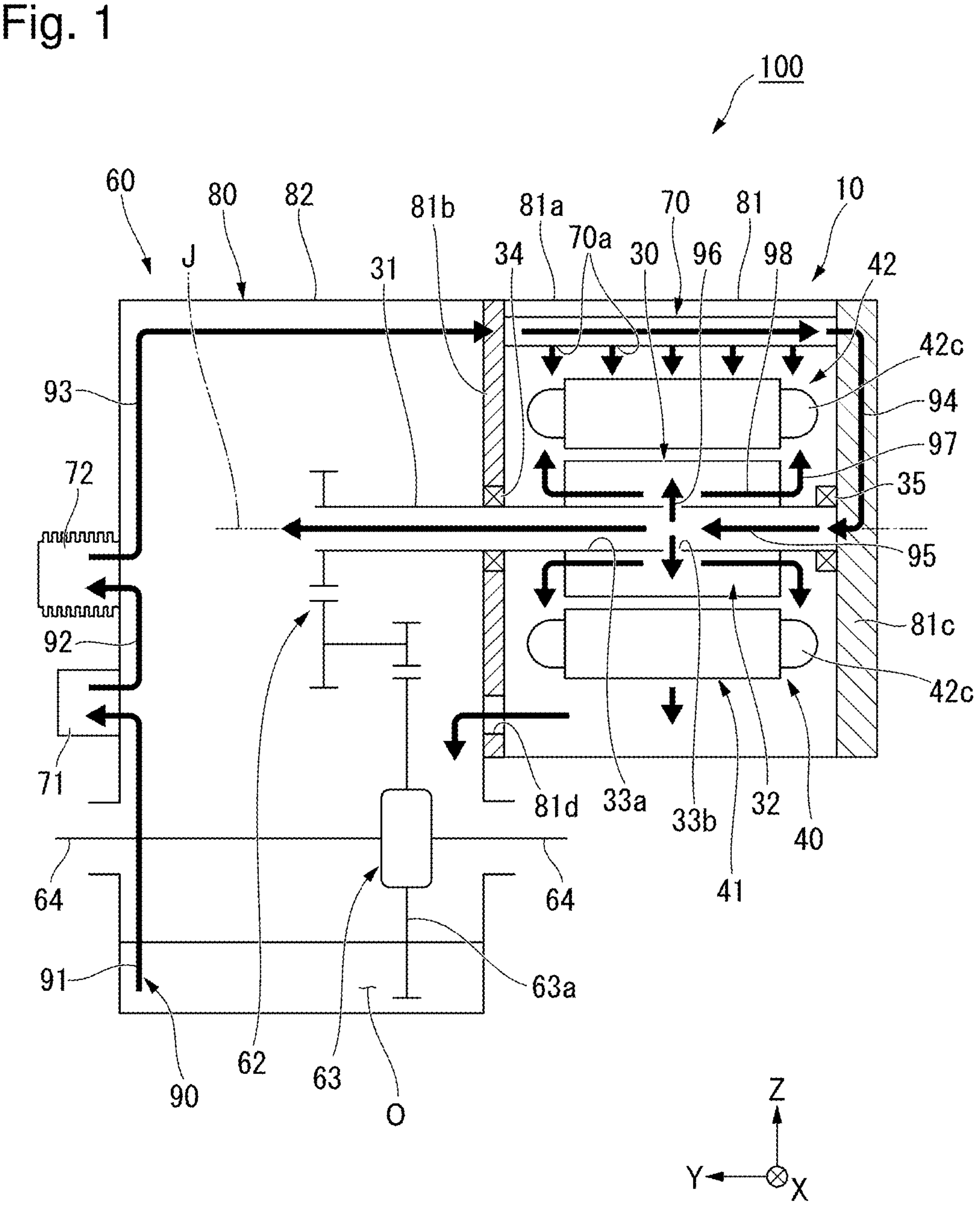
FIG. 1 is a sectional view schematically illustrating a drive device according to an embodiment.

The following description will be made with a vertical direction being defined on the basis of positional relationships in a case where a drive device of one embodiment is mounted in a vehicle positioned on a horizontal road surface. That is, it is sufficient that the relative positional relationships regarding the vertical direction described in the following embodiment are satisfied at least in the case where the drive device is mounted in the vehicle positioned on the horizontal road surface.

The drawings illustrate an XYZ coordinate system as a three-dimensional orthogonal coordinate system as appropriate. In the XYZ coordinate system, a Z axis direction is the vertical direction. A +Z side is a vertically upper side, and a −Z side is a vertically lower side. In the following description, the vertically upper side and the vertically lower side will be simply called "upper side" and "lower side", respectively. An X axis direction is a direction orthogonal to the Z axis direction and is a front-rear direction of the vehicle mounted with the drive device. In the following embodiment, a +X side is a front side of the vehicle, and a −X side is a rear side of the vehicle. A Y axis direction is a direction orthogonal to both the X axis direction and the Z axis direction, and is a left-right direction of the vehicle, i.e., a vehicle width direction. In the following embodiment, a +Y side is a left side of the vehicle, and a −Y side is a right side of the vehicle. Each of the front-rear direction and the left-right direction is a horizontal direction perpendicular to the vertical direction.

Note that the definition of the forward and rearward sides in the front-rear direction is not limited to the definition of the preferred embodiment described below, and that the +X side and the −X side may correspond to the rearward side and the forward side, respectively, of the vehicle. In this case, the +Y side is the right side of the vehicle, and the −Y side is the left side of the vehicle. In the present description, a "parallel direction" includes a substantially parallel direction, and an "orthogonal direction" includes a substantially orthogonal direction.

A central axis J illustrated in the drawings as appropriate is a virtual axis extending in a direction intersecting the vertical direction. More specifically, the central axis J extends in the Y axis direction orthogonal to the vertical direction, i.e., the left-right direction of the vehicle. In the following description, unless otherwise stated, a direction parallel to the central axis J is simply called "axial direction", a radial direction about the central axis J is simply called "radial direction", and a circumferential direction about the central axis J, i.e., a direction about the central axis J is simply called "circumferential direction".

Note that, in the following embodiment, the left side (+Y side) corresponds to "one side in the axial direction", and the right side (−Y side) corresponds to the "other side in the axial direction".

A drive device 100 of the present embodiment illustrated in FIG. 1 is a drive device that is mounted in a vehicle and rotates an axle 64. The vehicle in which the drive device 100 is mounted is a vehicle including a motor as a power source, such as a hybrid vehicle (HEV), a plug-in hybrid vehicle (PHV), or an electric vehicle (EV). As illustrated in FIG. 1, the drive device 100 includes a rotary electric machine 10, a housing 80, a gear mechanism 60, and a flow path 90. The rotary electric machine 10 includes a rotor 30 rotatable about the central axis J, and a stator 40 positioned radially outside the rotor 30. Configurations of the rotary electric machine 10 other than the above will be described later.

The housing 80 accommodates the rotary electric machine 10 and the gear mechanism 60. The housing 80 includes a motor housing 81, and a gear housing 82. The motor housing 81 is a housing that internally accommodates the rotor 30 and the stator 40. The motor housing 81 is connected to the right side of the gear housing 82. The motor housing 81 has a peripheral wall 81*a*, a partition wall 81*b*, and a lid 81*c*. The peripheral wall 81*a* and the partition wall 81*b* are each a part of an identical single member, for example. The lid 81*c* is separate from, for example, the peripheral wall 81*a* and the partition wall 81*b*.

The peripheral wall 81*a* has a tubular shape surrounding the central axis J and opening on the right side. The partition wall 81*b* is connected to an end part of the left side of the peripheral wall 81*a*. The partition wall 81*b* axially separates an inside of the motor housing 81 and an inside of the gear housing 82. The partition wall 81*b* has a partition wall opening 81*d* that connects the inside of the motor housing 81 and the inside of the gear housing 82. The partition wall 81*b* holds a bearing 34. The lid 81*c* is fixed to an end part of the right side of the peripheral wall 81*a*. The lid 81*c* closes an opening on the right side of the peripheral wall 81*a*. The lid 81*c* holds a bearing 35.

The gear housing 82 accommodates a speed reducer 62 and a differential gear 63, which will be described later, of the gear mechanism 60 and an oil O therein. The oil O is stored in a lower region in the gear housing 82. The oil O is circulated through the flow path 90, which will be described below. The oil O is used as a refrigerant for cooling the rotary electric machine 10. The oil O is used as lubricating oil for the decelerator 62 and the differential 63. As the oil O, it is preferable to use an oil equivalent to an automatic transmission fluid (ATF) having a relatively low viscosity in order to achieve functions of a refrigerant and a lubricating oil, for example.

The gear mechanism 60 is connected to the rotary electric machine 10 and transmits the rotation of the rotor 30 to the axle 64 of the vehicle. The gear mechanism 60 according to the present embodiment includes the speed reducer 62 connected to the rotary electric machine 10, and the differential gear 63 connected to the speed reducer 62. The differential gear 63 includes a ring gear 63*a*. To the ring gear 63*a*, torque output from the rotary electric machine 10 is transmitted via the decelerator 62. An end part of the lower side of the ring gear 63*a* is immersed in the oil O stored in the gear housing 82. When the ring gear 63*a* rotates, the oil O is stirred up. The oil O having been stirred up is supplied as a lubricating oil to, for example, the decelerator 62 and the differential 63.

Figure 2:
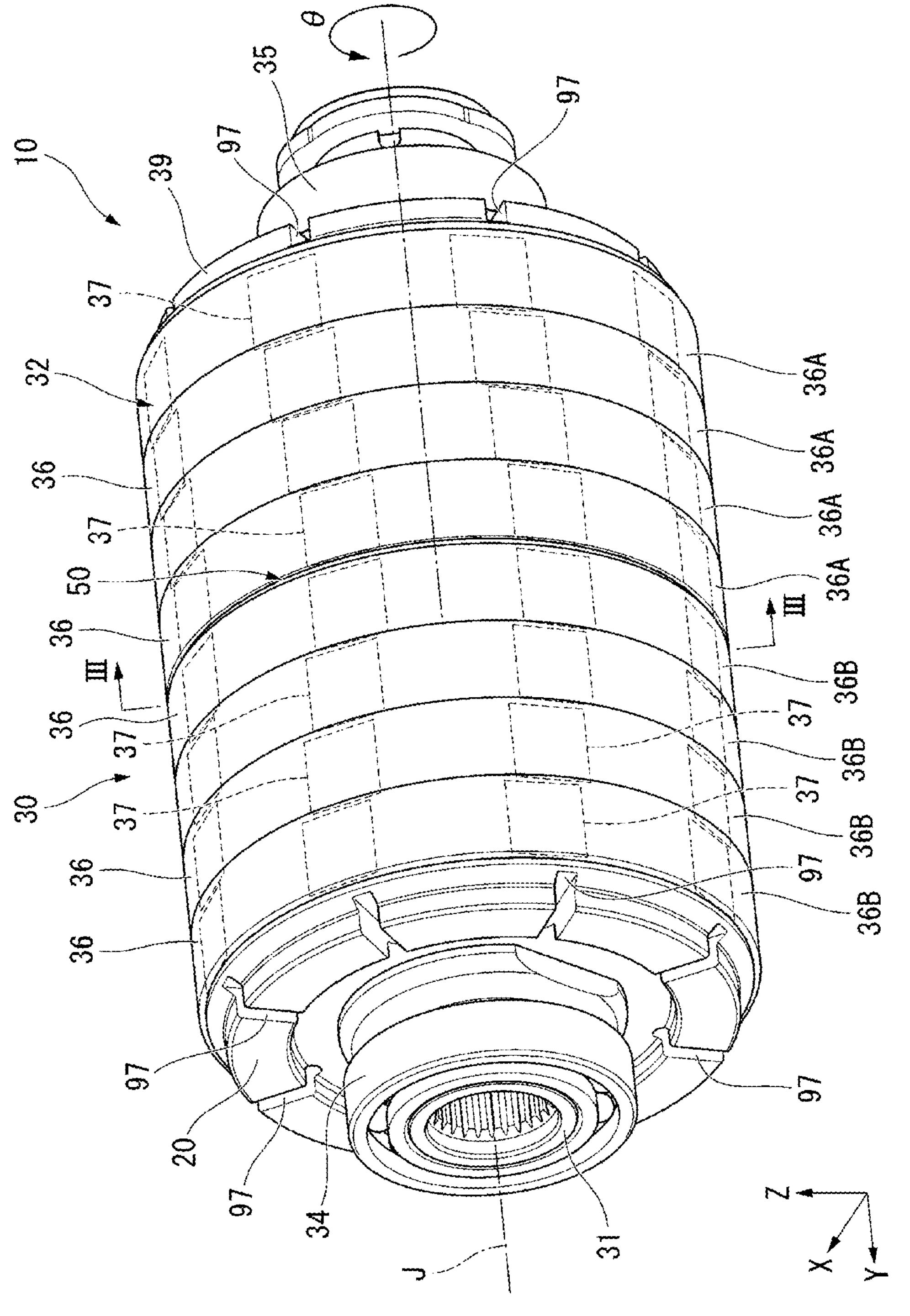
FIG. 2 is a perspective view illustrating a rotor of the embodiment.

The rotary electric machine 10 is a part that drives the drive device 100. The rotary electric machine 10 is positioned, for example, on the right side of the gear mechanism 60. In the present embodiment, the rotary electric machine 10 is a motor. The torque of the rotor 30 of the rotary electric machine 10 is transmitted to the gear mechanism 60. The rotor 30 includes a shaft 31 extending in the axial direction about the central axis J, and a rotor core 32 fixed to an outer peripheral surface of the shaft 31. As illustrated in FIG. 2, the rotor 30 includes a plurality of magnets 37 held by the rotor core 32, end plates 20, 39 disposed at both ends in the axial direction of the rotor core 32, and a plate 50.

As illustrated in FIG. 1, the shaft 31 is rotatable about the central axis J. The shaft 31 is rotatably supported by the bearings 34 and 35. In the present embodiment, the shaft 31 is a hollow shaft. The shaft 31 has a tubular shape through which the oil O as a refrigerant can circulate inside thereof. The shaft 31 extends across the inside of the motor housing 81 and the inside of the gear housing 82. An end part of the left side of the shaft 31 protrudes inside the gear housing 82. The decelerator 62 is connected to the end part of the left side of the shaft 31.

The shaft 31 has a first shaft hole 33*a* extending in the axial direction. An inside of the first shaft hole 33*a* is formed by the inside of the shaft 31 that is the hollow shaft. In the present embodiment, the first shaft hole 33*a* is a hole penetrating the shaft 31 in the axial direction, and is opened on both sides in the axial direction. In the present embodiment, the first shaft hole 33*a* is a circular hole about the central axis J.

Figure 3:
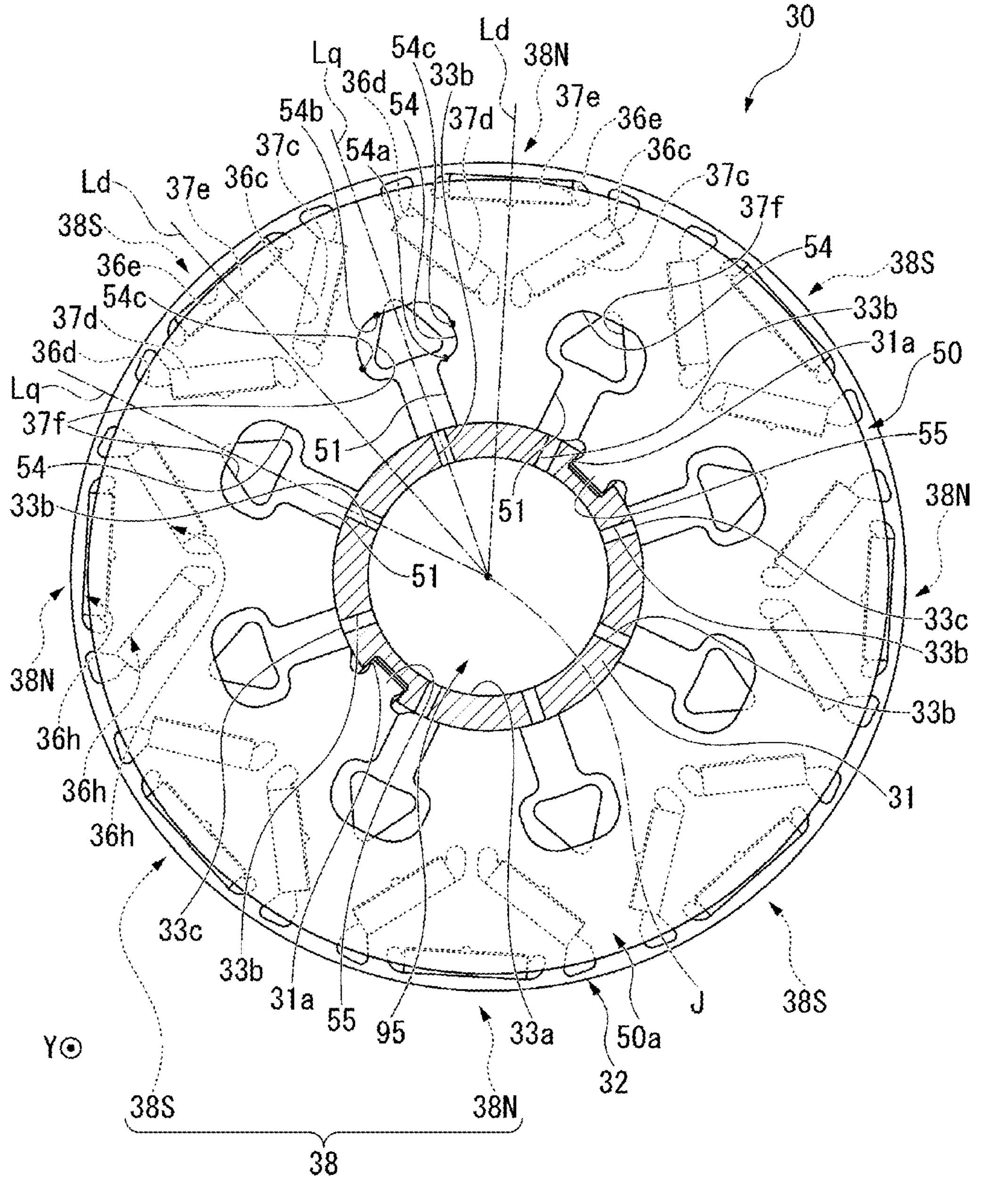
FIG. 3 is a sectional view illustrating the rotor of the embodiment, and being taken along line III-III in FIG. 2.
Figure 4:
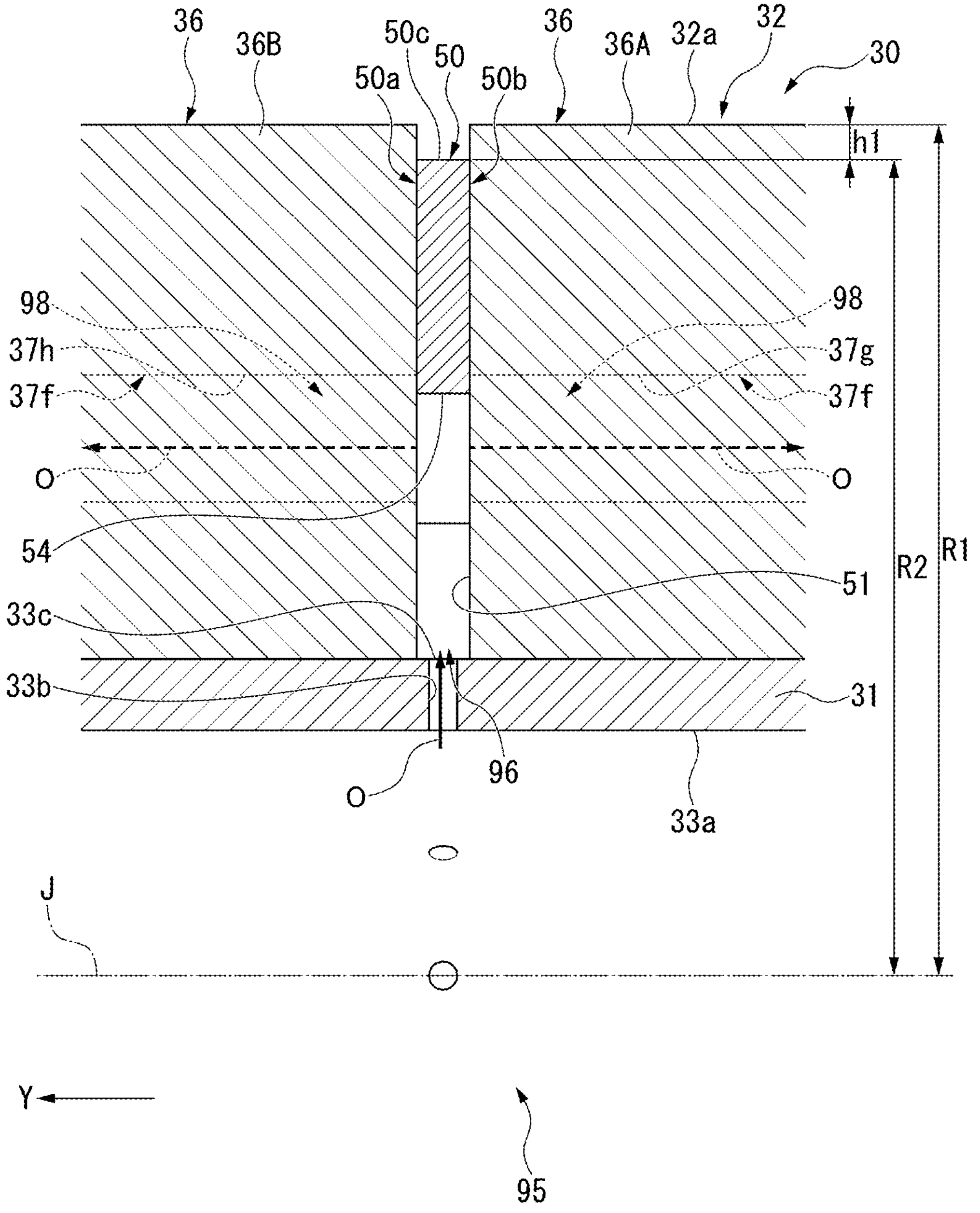
FIG. 4 is a sectional view illustrating a part of the rotor of the embodiment.

The shaft 31 has a second shaft hole 33*b* connected to the first shaft hole 33*a*. The second shaft hole 33*b* extends radially outward from the first shaft hole 33*a* and opens in the outer peripheral surface of the shaft 31. In the present embodiment, the second shaft hole 33*b* is a circular hole. As illustrated in FIGS. 3 and 4, the second shaft hole 33*b* has an opening 33*c* opened in the outer peripheral surface of the shaft 31. As illustrated in FIG. 3, in the present embodiment, a plurality of second shaft holes 33*b* is provided along the circumferential direction. The plurality of second shaft holes 33*b* is disposed at equal intervals over the entire circumference along the circumferential direction. In the present embodiment, eight second shaft holes 33*b* are provided. A circumferential position of the opening 33*c* of each of the second shaft holes 33*b* is a circumferential position of corresponding one of plate through-holes 54, which will be described later, adjacent to each other in the circumferential direction.

As illustrated in FIG. 2, the rotor core 32 includes a plurality of core pieces 36 disposed side by side in the axial direction. The core piece 36 is a magnetic body. The core piece 36 has a tubular shape about the central axis J, and has a cylindrical shape in the present embodiment. An inner peripheral surface of the core piece 36 is fixed to the outer peripheral surface of the shaft 31 by press fitting or the like.

The core piece 36 and the shaft 31 are fixed so as to be relatively immovable in the axial direction, the radial direction, and the circumferential direction. Although not illustrated, the core piece 36 includes a plurality of electromagnetic steel plates disposed to overlap each other in the axial direction.

The plurality of core pieces 36 include a plurality of first core pieces 36A and a plurality of second core pieces 36B. The plurality of first core pieces 36A constitute a part on the right side (−Y side) of the rotor core 32. The first core pieces 36A adjacent to each other in the axial direction are in contact with each other. The plurality of second core pieces 36B constitutes a part on the left side (+Y side) of the rotor core 32. The second core pieces 36B adjacent to each other in the axial direction are in contact with each other. The plate 50 is disposed between the plurality of first core pieces 36A and the plurality of second core pieces 36B in the axial direction. In the present embodiment, four first core pieces 36A and four second core pieces 36B are provided.

The plurality of first core pieces 36A is disposed to be shifted to one side (+θ side) in the circumferential direction with increasing a distance from the plate 50 to the right side (−Y side). Note that, the one side (+θ side) in the circumferential direction is a side that advances clockwise about the central axis J as viewed from the right side (−Y side) in the circumferential direction, that is, a side (+θ side) on which an arrow θ illustrated in FIG. 2 faces. The plurality of second core pieces 36B is disposed to be shifted to one side (+θ side) in the circumferential direction with increasing a distance to the left side (+Y side) from the plate 50. That is, in the present embodiment, a twist direction of a step skew of the plurality of first core pieces 36A disposed on the right side of the plate 50 is different from a twist direction of a step skew of the plurality of second core pieces 36B disposed on the left side of the plate 50. This configuration obtains an effect in which cogging torque and torque ripple can be reduced.

As illustrated in FIG. 3, the rotor core 32 has a plurality of magnet holes 36*h*. The plurality of magnet holes 36*h* passes through the rotor core 32 in the axial direction, for example. The plurality of magnet holes 36*h* internally accommodates the corresponding plurality of magnets 37. A method for fixing the magnet 37 in the magnet hole 36*h* is not particularly limited. The plurality of magnet holes 36*h* includes a pair of first magnet holes 36*c* and 36*d* and a second magnet hole 36*e*.

The type of the plurality of magnets 37 is not particularly limited. The magnet 37 may be, for example, a neodymium magnet or a ferrite magnet. The plurality of magnets 37 includes a pair of first magnet holes 36*c* and 36*d* disposed in a pair of first magnets 37*c* and 37*d*, respectively, and a second magnet 37*e* disposed in the second magnet hole 36*e*.

In the present embodiment, a plurality of pairs of first magnet holes 36*c* and 36*d*, a plurality of pairs of first magnets 37*c* and 37*d*, a plurality of second magnet holes 36*e*, and a plurality of second magnets 37*e* are provided at intervals in the circumferential direction. For example, eight pairs of first magnet holes 36*c* and 36*d*, eight pairs of first magnets 37*c* and 37*d*, eight second magnet holes 36*e*, and eight second magnet 37*e* are provided.

The rotor 30 has a plurality of magnetic poles 38 disposed at intervals in the circumferential direction. For example, eight magnetic poles 38 are provided. For example, the plurality of magnetic poles 38 are disposed at equal intervals over the entire circumference along the circumferential direction. The plurality of magnetic poles 38 includes a plurality of magnetic poles 38N in which a magnetic pole on the outer peripheral surface of the rotor core 32 is an N pole and a plurality of magnetic poles 38S in which a magnetic pole on the outer peripheral surface of the rotor core 32 is an S pole. For example, four magnetic poles 38N and four magnetic poles 38S are provided. Four magnetic poles 38N and four magnetic poles 38S are alternately disposed along the circumferential direction. The configurations of the magnetic poles 38 are similar to one another except that the magnetic poles on the outer peripheral surface of the rotor core 32 are different and positions in the circumferential direction are different.

The magnetic pole 38 includes the magnet 37 and the magnet hole 36*h* in which the magnet 37 is disposed. In the present embodiment, the magnetic pole 38 includes the pair of first magnet holes 36*c* and 36*d*, the pair of first magnets 37*c* and 37*d*, the second magnet hole 36*e*, and the second magnet 37*e* one by one.

In the magnetic pole 38, the pair of first magnet holes 36*c* and 36*d* are disposed at intervals in the circumferential direction. The first magnet hole 36*c* and the first magnet hole 36*d* are disposed with a magnetic pole center line Ld interposed therebetween in the circumferential direction. The magnetic pole center line Ld is a virtual line passing through a center of the magnetic pole 38 in the circumferential direction and the central axis J and extending in the radial direction. The magnetic pole center line Ld is provided for each magnetic pole 38. The magnetic pole center line Ld passes through on a d axis of the rotor 30 as viewed in the axial direction. A direction where the magnetic pole center line Ld extends is a d-axis direction of the rotor 30. The first magnet hole 36*c* and the first magnet hole 36*d* are disposed line-symmetrically with respect to the magnetic pole center line Ld as viewed in the axial direction.

The pair of first magnet holes 36*c* and 36*d* extend in directions away from each other in the circumferential direction outward in the radial direction from the inside in the radial direction as viewed in the axial direction. That is, a distance in the circumferential direction between the first magnet hole 36*c* and the first magnet hole 36*d* increases toward the outside in the radial direction from the inside in the radial direction. The pair of first magnet holes 36*c* and 36*d* are disposed along a V shape expanding in the circumferential direction outward in the radial direction as viewed in the axial direction. The pair of first magnets 37*c* and 37*d* disposed in the pair of first magnet holes 36*c* and 36*d* are disposed along a V shape expanding in the circumferential direction outward in the radial direction as viewed in the axial direction.

The second magnet hole 36*e* is positioned between ends on the outside in the radial direction of the pair of first magnet holes 36*c* and 36*d* in the circumferential direction. The second magnet hole 36*e* extends, for example, substantially linearly in a direction orthogonal to the radial direction as viewed in the axial direction. The second magnet hole 36*e*, for example, extends in a direction orthogonal to the magnetic pole center line Ld as viewed in the axial direction. The pair of first magnet holes 36*c* and 36*d* and the second magnet hole 36*e* are disposed along, for example, a V shape as viewed in the axial direction. The pair of first magnets 37*c* and 37*d* disposed in the pair of first magnet holes 36*c* and 36*d* and the second magnet 37*e* disposed in the second magnet hole 36*e* are disposed along a V shape as viewed in the axial direction.

The rotor core 32 includes a plurality of core holes 37*f* extending in the axial direction and disposed at intervals in the circumferential direction. The plurality of core holes 37*f* are disposed on an inter-magnetic pole center line Lq as viewed in the axial direction. The inter-magnetic pole center line Lq is a virtual line that passes through the center in the circumferential direction between the magnetic poles 38 adjacent to each other in the circumferential direction and the central axis J and extends in the radial direction. The inter-magnetic pole center line Lq passes through on a q axis of the rotor 30 as viewed in the axial direction. A direction where the inter-magnetic pole center line Lq extends is a q-axis direction of the rotor 30. The inter-magnetic pole center line Lq is provided in every interval between the magnetic poles 38. The direction where the magnetic pole center line Ld extends and the direction where the inter-magnetic pole center line Lq extends are directions intersecting each other. The magnetic pole center line Ld and the inter-magnetic pole center line Lq are alternately provided along the circumferential direction. The core hole 37*f* is disposed on the inter-magnetic pole center line Lq as described above, so that a position of the core hole 37*f* in the circumferential direction includes a center position in the circumferential direction between the magnetic poles 38 adjacent to each other in the circumferential direction.

In the present embodiment, a dimension of the core hole 37*f* in the circumferential direction decreases toward the outside in the radial direction. In the present embodiment, the core hole 37*f* has a substantially triangular shape with rounded corners as viewed in the axial direction. An outer part of the core hole 37*f* in the radial direction is positioned in the circumferential direction between the first magnet hole 36*c* in one magnetic pole 38 of the magnetic poles 38 adjacent to each other in the circumferential direction and the first magnet hole 36*d* in the other magnetic pole 38 of the magnetic poles 38 adjacent to each other in the circumferential direction. An inner part of the core hole 37*f* in the radial direction is positioned on the inside in the radial direction with respect to the magnet hole 36*h*.

As illustrated in FIG. 4, the core hole 37*f* includes a first core hole 37*g* and a second core hole 37*h*. The first core hole 37*g* is provided in a part of the rotor core 32 positioned on the right side (−Y side) with respect to the plate 50. The first core hole 37*g* passes through the plurality of first core pieces 36A in the axial direction, the plurality of first core pieces 36A being positioned on the right side with respect to the plate 50. A plurality of first core holes 37*g* is disposed at intervals in the circumferential direction. The second core hole 37*h* is provided in a part of the rotor core 32 positioned on the left side (+Y side) with respect to the plate 50. The second core hole 37*h* passes through the plurality of second core pieces 36B in the axial direction, the plurality of second core pieces 36B being positioned on the left side with respect to the plate 50. A plurality of second core holes 37*h* is disposed at intervals in the circumferential direction. The first core holes 37*g* and the second core holes 37*h* are disposed at positions overlapping each other as viewed in the axial direction.

Figure 5:
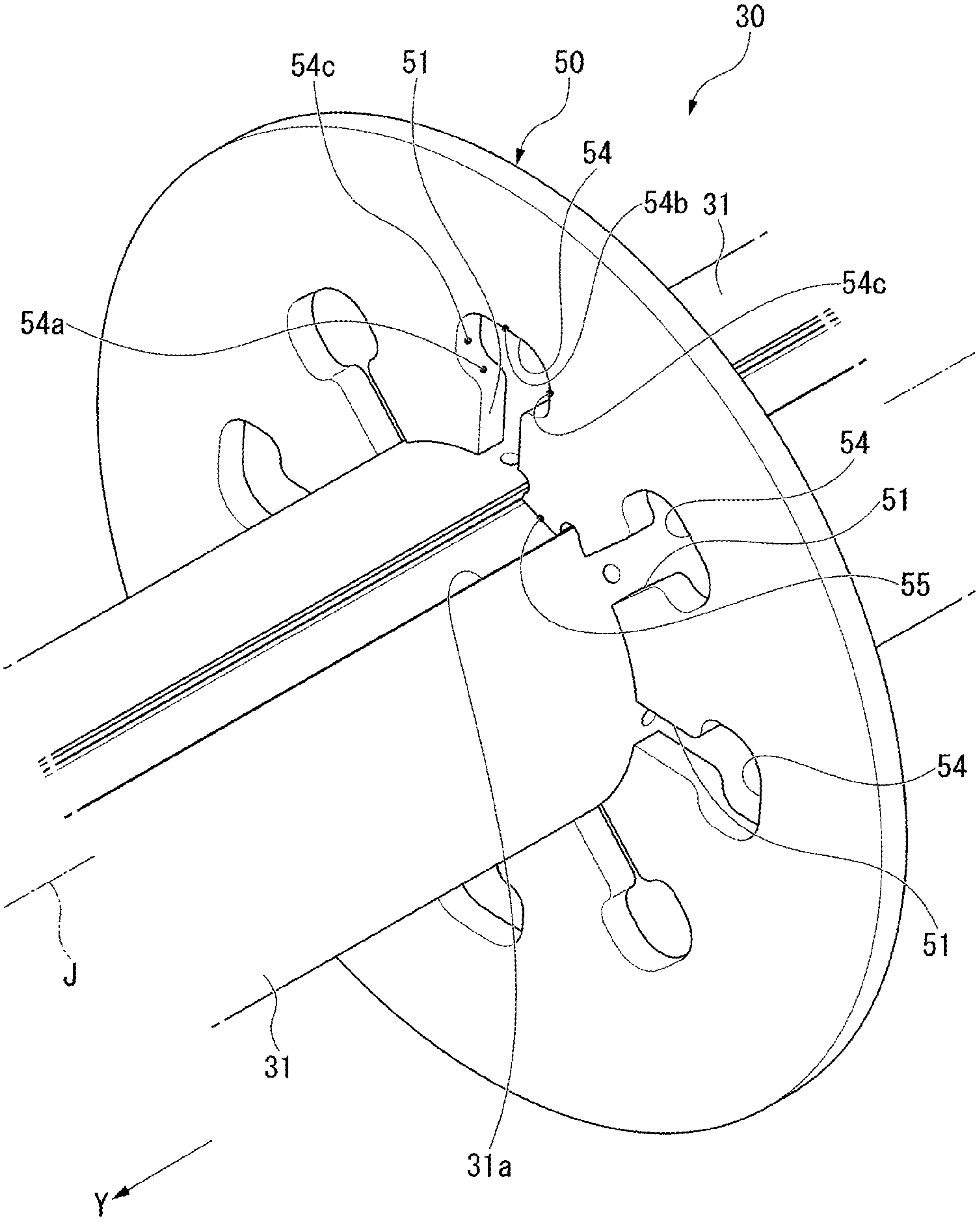
FIG. 5 is a perspective view illustrating a part of a shaft and a plate of the embodiment.

The plate 50 is disposed between the core pieces 36 adjacent to each other in the axial direction. In the present embodiment, the plate 50 is positioned between the first core piece 36A and the second core piece 36B in the axial direction. The plate 50 is in contact with the core pieces 36 sandwiching the plate 50 in the axial direction. As illustrated in FIG. 5, the plate 50 has an annular shape surrounding the shaft 31. More particularly, the plate 50 has an annular shape about the central axis J. The plate 50 is in a plate shape in which a plate surface faces the axial direction. A material constituting the plate 50 is a non-magnetic metal material such as stainless steel or an aluminum alloy, for example. The material constituting the plate 50 has an electrical resistivity of 74 μΩ·cm or less. The electrical resistivity is more preferably in a range from 26μΩ·cm to 74μΩ·cm inclusive. Here, aluminum alloys of A5025 and A6061 have electrical resistivity of 26 μΩ·cm and that of 23 μΩ·cm, respectively. Thus, the material constituting the plate 50 and having an electrical resistivity of 26 μΩ·cm or more enables the aluminum alloy of A5025 to be used, the aluminum alloy allowing reduction in weight and being less affected by eddy current loss.

As illustrated in FIG. 4, the plate 50 has an outer diameter that is slightly smaller than an outer diameter of the rotor core 32 in the present embodiment. That is, a second distance R2 from the central axis J to an outer edge 50*c* of the plate 50 is shorter than a first distance R1 from the central axis J to an outer edge 32*a* of the rotor core 32. For example, a difference h1 between the first distance R1 and the second distance R2 is 1 mm or more. The outer diameter of the plate 50 is 99% or less of the outer diameter of the rotor core 32. In the present embodiment, the plate 50 includes a left surface 50*a* on the left side (+Y side) and a right surface 50*b* on the right side (−Y side) that are each a flat surface. In the present embodiment, the left surface 50*a* and the right surface 50*b* are orthogonal to the axial direction. The left surface 50*a* is in contact with the second core piece 36B located on the left side of the plate 50. The right surface 50*b* is in contact with the first core piece 36A located on the right side of the plate 50. No gap is provided between the second core piece 36B located on the left side of the plate 50 and the left surface 50*a* in the axial direction. No gap is provided between the first core piece 36A located on the right side of the plate 50 and the right surface 50*b* in the axial direction.

As illustrated in FIG. 3, the plate 50 is provided covering at least a part of an opening of each of the magnet holes 36*c*, 36*d*, and 36*e*. The plate 50 includes a plurality of plate through-holes 54 overlapping the core hole 37*f* when viewed in the axial direction, and a flow path 51 connecting the second shaft hole 33*b* and the plate through-hole 54. As illustrated in FIG. 5, the plurality of plate through-holes 54 and a plurality of the flow paths 51 pass through the plate 50 in the axial direction. The plurality of plate through-holes 54 and the plurality of the flow paths 51 are disposed at intervals in the circumferential direction. More specifically, the plurality of plate through-holes 54 and the plurality of the flow paths 51 are arranged at equal intervals over the entire circumference along the circumferential direction. As illustrated in FIG. 3, the plurality of plate through-holes 54 and the plurality of the flow paths 51 are each disposed at a position aligned with the inter-magnetic pole center line Lq when viewed in the axial direction. The plate through-holes 54 and the flow paths 51 are each disposed at a circumferential position aligned with the center position between the magnetic poles 38 adjacent to each other in the circumferential direction. Each of the flow paths 51 aligns with the opening 33*c* of each of the second shaft holes 33*b* in the circumferential direction, and is disposed facing the opening 33*c* radially inward. That is, the plate through-hole 54 and the flow path 51 communicate with the second shaft hole 33*b* aligned in the circumferential direction.

As illustrated in FIG. 5, the plurality of plate through-holes 54 overlaps with the respective plurality of core holes 37*f* when viewed in the axial direction. In the present embodiment, each of the plate through-holes 54 is larger than the core hole 37*f* when viewed in the axial direction. The plate through-hole 54 has a substantially rectangular shape that does not overlap the core hole 37*f* except for a part on a radially outer side of the core hole 37*f* when viewed in the axial direction. In the present embodiment, the plate through-hole 54 includes an inner edge 54*a* on its radially inner side that is entirely disposed radially inward away from an inner edge of the core hole 37*f*. The plate through-hole 54 includes an outer edge 54*b* on its radially outer side that is disposed overlapping an outer end of the core hole 37*f*. The plate through-hole 54 includes side edges 54*c* facing each other in the circumferential direction that are each entirely disposed away from a side edge of the core hole 37*f* outward in the circumferential direction. In the present embodiment, the plate through-hole 54 has a circumferential dimension smaller than a circumferential distance between the plate through-holes 54 adjacent to each other in the circumferential direction.

The plate through-hole 54 includes the pair of side edges 54*c* including: inner ends in the radial direction that are connected to the inner edge 54*a*; and outer ends in the radial direction that are connected to the outer edge 54*b*, thereby forming a rectangular shape. The plate through-hole 54 has rounded corners. The plurality of plate through-holes 54 is connected to the respective plurality of core holes 37*f* in the axial direction.

As illustrated in FIGS. 3 and 5, the plate 50 includes a fitting protrusion 55. The fitting protrusion 55 is provided on a radially inner edge of the plate 50. The fitting protrusion 55 protrudes radially inward. The fitting protrusion 55 is fitted in a fitting recess 31*a* provided on the outer peripheral surface of the shaft 31. As a result, the plate 50 is positioned in the circumferential direction with respect to the shaft 31. The fitting recess 31*a* extends in the axial direction. A pair of fitting protrusions 55 and a pair of fitting recesses 31*a* are provided across the central axis J.

As illustrated in FIG. 1, the stator 40 radially faces the rotor 30 with a gap therebetween. The stator 40 surrounds the rotor 30 over the entire circumference in the circumferential direction from radially outward. The stator 40 is fixed to the inside of the motor housing 81. The stator 40 includes a stator core 41 and a coil assembly 42.

The stator core 41 has an annular shape surrounding the central axis J of the rotary electric machine 10. The stator core 41 includes a plurality of plate members such as electromagnetic steel sheets, for example, stacked in the axial direction. The coil assembly 42 includes a plurality of coils 42*c* attached to the stator core 41 along the circumferential direction. The plurality of coils 42*c* is attached to teeth of the stator core 41 with insulators (not illustrated) interposed therebetween. The plurality of coils 42*c* is disposed along the circumferential direction. The coil 42*c* has a part axially protruding from the stator core 41.

The flow path 90 is provided in the housing 80. The oil O as a fluid flows through the flow path 90. The flow path 90 is provided across the inside of the motor housing 81 and the inside of the gear housing 82. The flow path 90 allows the oil O stored in the gear housing 82 to be supplied to the rotary electric machine 10 in the motor housing 81 and to return to the inside of the gear housing 82 again. The flow path 90 is provided with a pump 71 and a cooler 72. The flow path 90 includes a first flow path 91, a second flow path 92, a third flow path 93, a fluid supply part 70, an in-shaft flow path 95, a connection flow path 94, a plate flow path 96, an in-rotor core flow path 98, and a guide flow path 97.

The first flow path 91, the second flow path 92, and the third flow path 93 are provided in a wall of the gear housing 82, for example. The first flow path 91 connects the pump 71 and a part where the oil O is stored inside the gear housing 82. The second flow path 92 connects the pump 71 with the cooler 72. The third flow path 93 connects the cooler 72 with the fluid supply part 70. In the present embodiment, the third flow path 93 is connected to an end on the left side of the fluid supply part 70, that is, an upstream part of the fluid supply part 70.

The fluid supply part 70 supplies the oil O to the stator 40. In the present embodiment, the fluid supply part 70 is in a tubular shape extending in the axial direction. In other words, in the present embodiment, the fluid supply part 70 is a pipe extending in the axial direction. Both ends of the fluid supply part 70 in the axial direction are supported by the motor housing 81. The end on the left side of the fluid supply part 70 is supported by, for example, the partition wall 81*b*. An end on the right side of the fluid supply part 70 is supported by, for example, the lid 81*c*. The fluid supply part 70 is positioned radially outward of the stator 40. In the present embodiment, the fluid supply part 70 is positioned above the stator 40.

The fluid supply part 70 has a supply port 70*a* for supplying the oil O to the stator 40. In the present embodiment, the supply port 70*a* is an injection port that injects a part of the oil O having flowed into the fluid supply part 70 to the outside of the fluid supply part 70. The supply port 70*a* is formed by a hole passing through the wall of the fluid supply part 70 from an inner peripheral surface to an outer peripheral surface. A plurality of supply ports 70*a* are provided in the fluid supply part 70. The plurality of supply ports 70*a* are disposed at intervals in the axial direction or the circumferential direction, for example.

The connection flow path 94 connects the fluid supply part 70 and the in-shaft flow path 95. In the present embodiment, the connection flow path 94 is provided in the lid 81*c*. The in-shaft flow path 95 is formed by the inside of the hollow shaft 31. The in-shaft flow path 95 extends in the axial direction. The in-shaft flow path 95 is disposed across the inside of the motor housing 81 and the inside of the gear housing 82.

The plate flow path 96 connects the in-shaft flow path 95 and the in-rotor core flow path 98. As illustrated in FIG. 4, the plate flow path 96 includes the plate 50 and the core piece 36 (second core piece 36B) located on the left side (+Y side) of the plate 50. The plate flow path 96 internally includes the plate through-hole 54 and the flow path 51. The plate flow path 96 communicates with the in-shaft flow path 95 through the second shaft hole 33*b*.

The in-rotor core flow path 98 is composed of each of the plurality of core holes 37*f*. That is, a plurality of in-rotor core flow paths 98 is provided at intervals in the circumferential direction. As illustrated in FIG. 1, the in-rotor core flow path 98 connects the plate flow path 96 and the guide flow path 97. As illustrated in FIG. 2, the guide flow path 97 is provided in each of the pair of end plates 20 and 39. In each of the end plates 20 and 39, a plurality of guide flow paths 97 is provided at intervals in the circumferential direction. Each of the guide flow paths 97 is connected to an end of corresponding one of the core holes 37*f* in the axial direction. The guide flow path 97 extends in the radial direction. The guide flow path 97 opens radially outward.

Figure 6:
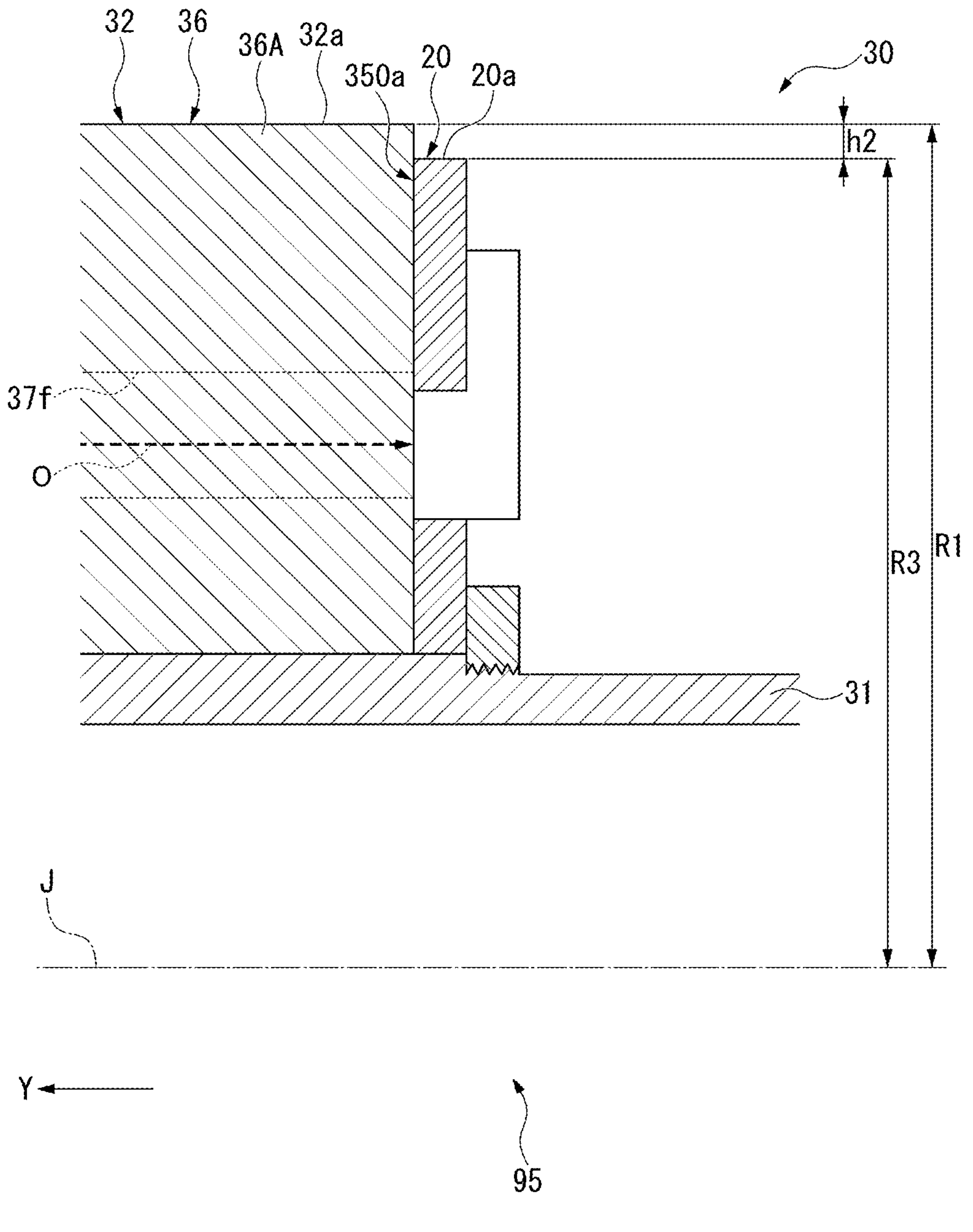
FIG. 6 is a sectional view illustrating an end plate of the embodiment.

As illustrated in FIG. 2, the pair of the end plates 20 and 39 is made of a non-magnetic metal material and disposed at respective axial ends of the rotor core 32. As illustrated in FIG. 6, a third distance R3 from the central axis J to an outer edge 20*a* of the end plate 20 (the same applies to the end plate 39) is shorter than the first distance R1 from the central axis J to the outer edge 32*a* of the rotor core 32. For example, a difference h2 between the first distance R1 and the third distance R3 is 1 mm or more. The end plates 20 and 39 are made of the same material as the plate 50. That is, the material constituting the end plates 20 and 39 is a metal material such as a non-magnetic aluminum alloy. The material constituting the end plates 20 and 39 has an electrical resistivity of 74 μΩ·cm or less.

As illustrated in FIG. 1, when the pump 71 is driven, the oil O stored in the gear housing 82 is sucked up through the first flow path 91, and flows into the cooler 72 through the second flow path 92. The oil O having flowed into the cooler 72 is cooled in the cooler 72, then passes through the third flow path 93, and flows into the fluid supply part 70. A part of the oil O having flowed into the fluid supply part 70 is injected from the supply port 70*a* and is supplied to the stator 40. Another part of the oil O having flowed into the fluid supply part 70 also passes through the connection flow path 94, and flows into the in-shaft flow path 95.

As illustrated in FIG. 4, a part of the oil O flowing through the in-shaft flow path 95 flows into the plate flow path 96 from the second shaft hole 33*b*. In the plate flow path 96, the oil O flows from the flow path 51 to the plate through-hole 54. The oil O having flowed into the plate flow path 96 flows into the in-rotor core flow path 98 through the plate through-hole 54. More specifically, a part of the oil O having flowed into the plate through-hole 54 of the plate flow path 96 flows into the first core hole 37*g* provided in a part of the rotor core 32, the part being located on the right side (−Y side) of the plate 50. Another part of the oil O having flowed into the plate through-hole 54 flows into the second core hole 37*h* provided in a part of the rotor core 32, the part being located on the left side (+Y side) of the plate 50.

As illustrated in FIG. 1, the oil O having flowed into the in-rotor core flow path 98 flows through the guide flow path 97 and scatters to the stator 40. Another part of the oil O having flowed into the in-shaft flow path 95 is discharged into the gear housing 82 from a left opening of the shaft 31, and is stored in the gear housing 82 again.

The oil O supplied from the supply port 70*a* to the stator 40 takes heat from the stator 40, and the oil O supplied from the shaft 31 to the rotor 30 and the stator 40 takes heat from the rotor 30 and the stator 40. The oil O having cooled the stator 40 and the rotor 30 falls downward to accumulate in a lower region in the motor housing 81. The oil O accumulated in the lower region in the motor housing 81 returns to the inside of the gear housing 82 through the partition wall opening 81*d* provided in the partition wall 81*b*. As described above, the flow path 90 allows the oil O stored in the gear housing 82 to be supplied to the rotor 30 and the stator 40.

According to the present embodiment, the shaft 31 includes the first shaft hole 33*a* extending in the axial direction and the second shaft hole 33*b* extending radially outward from the first shaft hole 33*a* and opening to the outer peripheral surface of the shaft 31. The rotor core 32 includes a plurality of core holes 37*f* extending in the axial direction and disposed at intervals in the circumferential direction. The plate 50 includes the plate through-hole 54 overlapping the core hole 37*f* when viewed in the axial direction, and the flow path 51 connecting the second shaft hole 33*b* and the plate through-hole 54. The second distance R2 from the central axis J to the outer edge of the plate 50 is shorter than the first distance R1 from the central axis J to the outer edge of the rotor core 32. Thus, an eddy current flowing through the rotor core 32 has a high current density on the surface of the rotor core 32 due to the skin effect. When the rotor core 32 is divided in the axial direction and has a structure in which the plurality of core pieces 36 is stacked in the axial direction, the eddy current flows across between the corresponding core pieces 36. According to the above configuration, the plate 50 has a smaller diameter than the rotor core 32 as illustrated in FIG. 4. Thus, the eddy current on outer peripheral surfaces (surfaces facing radially outward) of the first core piece 36A and the second core piece 36B cannot flow across the plate 50 unless the eddy current flows radially inward at the outer edge 50*c* of the plate 50. Then, the eddy current flowing through the plate 50 has a long path length to be less likely to flow to the plate 50, so that eddy current loss can be suppressed. As a result, deterioration in motor efficiency can be prevented in the present embodiment. Additionally, the plate 50 is made of a metal material, and thus is excellent in balance among ease of molding, reliability against heat, and price, as compared with other materials (such as ceramic and resin).

Figure 7:
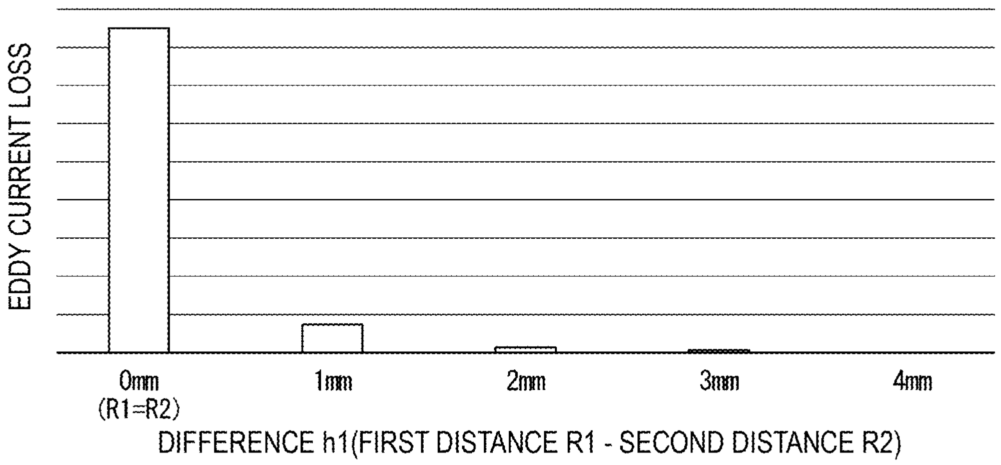
FIG. 7 is a diagram illustrating a relationship between a difference between a first distance and a second distance, and eddy current loss.

According to the present embodiment, the difference h1 between the first distance R1 from the central axis J to the outer edge 32*a* of the rotor core 32 and the second distance R2 from the central axis J to the outer edge 50*c* of the plate 50 is 1 mm or more as illustrated in FIG. 3. Thus, the effect of suppressing the eddy current loss described above can be sufficiently obtained. For example, when the first distance R1 and the second distance R2 are equal to each other to result in the difference h1 of 0 mm, the eddy current loss increases as illustrated in FIG. 7. In contrast, it is found that when the difference h1 is 1 mm, the eddy current loss can be suppressed to ⅛ or less as compared with when the difference h1 is 0 mm. As illustrated in FIG. 7, the eddy current loss further decreases as the difference h1 increases to 2 mm, 3 mm, and 4 mm.

According to the present embodiment, the outer diameter of the plate 50 is 99% or less of the outer diameter of the rotor core 32. Thus, the effect of suppressing the eddy current loss described above can be sufficiently obtained. More preferably, the outer diameter of the plate 50 is 98% or less of the outer diameter of the rotor core 32.

According to the present embodiment, the rotor core 32 includes the plurality of magnet holes 36*c*, 36*d*, and 36*e* in which the respective magnets 37 are disposed. The plate 50 is provided covering at least a part of the opening of each of the magnet holes 36*c*, 36*d*, and 36*e*. Thus, even when the magnet 37 is lost in one of the magnet holes 36*c*, 36*d*, and 36*e*, scattering of fragments from the one of the magnet holes 36*c*, 36*d*, and 36*e* can be suppressed by covering a part of an opening of the one with the plate 50.

According to the present embodiment, the material constituting the plate 50 has an electrical resistivity of 74 μΩ·cm or less. Thus, the eddy current can be suppressed by the configuration described above, so that the eddy current loss can be sufficiently reduced even when a material that may cause the plate 50 to have an electrical resistivity of 74 μΩ·cm or less to increase the eddy current loss, such as stainless steel or an aluminum alloy, is used for the plate 50. The material constituting the plate 50 preferably has an electrical resistivity in the range from 26 μΩ·cm to 74 μΩ·cm inclusive. In this case, an aluminum alloy of A5025 having an electric resistivity of 26 μΩ·cm and achieving reduction in weight can be used, for example.

According to the present embodiment, the plate 50 is made of an aluminum alloy. In this case, the reduction in weight can be achieved by using an aluminum alloy for the plate 50. Conversely, the aluminum alloy has a low electrical resistivity, so that the eddy current loss may increase. However, the eddy current can be suppressed by the configuration described above, so that the eddy current loss can be sufficiently reduced even when an aluminum alloy is used for the plate 50.

According to the present embodiment, the end plates 20 and 39 each made of a non-magnetic metal material are provided at the respective axial ends of the rotor core 32. The third distance R3 from the central axis J to the outer edge of each of the end plates 20 and 39 is shorter than the first distance R1 from the central axis J to the outer edge 32*a* of the rotor core 32. Thus, the eddy current generated in each of the end plates 20 and 39 can be suppressed, so that deterioration in motor efficiency can be more effectively prevented.

According to the present embodiment, the plate 50, and the end plates 20 and 39, are made of the same material. Thus, parts related to manufacturing of the rotor 30 can be easily procured.

The present invention is not limited to the above-described embodiment, and other configurations and other methods can be employed within the scope of the technical idea of the present invention.

Although the difference h1 between the first distance R1 from the central axis J to the outer edge 32*a* of the rotor core 32 and the second distance R2 from the central axis J to the outer edge 50*c* of the plate 50 is 1 mm or more, and the outer diameter of the plate 50 is 99% or less of the outer diameter of the rotor core 32, in the embodiment described above, the present invention is not limited to the difference h1 and the outer diameter of the plate 50.

The plate 50 is not limited to a circular shape, and may have any shape. The plate 50 may be configured not to cover at least a part of the opening of each of the magnet holes 36*c*, 36*d*, and 36*e*. The electrical resistivity of the material constituting the plate 50 is not limited to 74 μΩ·cm or less. The aluminum alloy described above is an example of the metal material of the non-magnetic body in the plate 50, and the metal material is not limited to the aluminum alloy.

Although the end plates 20 and 39 each made of a non-magnetic metal material are provided at the respective axial ends of the rotor core 32, and the third distance R3 from the central axis J to the outer edge of each of the end plates 20 and 39 is shorter than the first distance R1 in the present embodiment, a relationship between outer dimensions of the end plates 20 and 39, and the rotor core 32 is not particularly limited. The plate 50 and the end plates 20 and 39 are not limited to being made of the same material, and may be each made of a different material.

The rotary electric machine to which the present invention is applied is not limited to a motor, and may be a generator. The application of the rotary electric machine is not particularly limited. The rotary electric machine may be mounted in equipment other than the vehicle. The application of the drive device to which the present invention is applied is not particularly limited. For example, the drive device may be mounted in a vehicle for a purpose other than the purpose of rotating the axle, or may be mounted on equipment other than the vehicle. The attitude when the rotary electric machine and the drive device are used is not particularly limited. The central axis of the rotary electric machine may be inclined with respect to the horizontal direction orthogonal to the vertical direction or may extend in the vertical direction. The features described above in the present description may be appropriately combined as long as no conflict arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor provided in a motor, the rotor comprising:
a shaft extending in an axial direction about a central axis;
a rotor core including a plurality of core pieces disposed side by side in the axial direction and fixed to an outer peripheral surface of the shaft; and
a plate made of a non-magnetic metal material disposed between the core pieces adjacent to each other in the axial direction and surrounding the shaft,
the shaft including;
a first shaft hole extending in the axial direction; and
a second shaft hole extending radially outward from the first shaft hole and opening to an outer peripheral surface of the shaft,
the rotor core including a plurality of core holes extending in the axial direction and disposed at intervals in a circumferential direction,
the plate including;
a through-hole overlapping the core hole when viewed in the axial direction; and
a flow path connecting the second shaft hole and the through-hole, and
the plate having an outer edge away from the central axis by a second distance that is shorter than a first distance from the central axis to an outer edge of the rotor core.

2. The rotor according to claim 1, wherein the first distance and the second distance have a difference of 1 mm or more.

3. The rotor according to claim 1, wherein the plate has an outer diameter that is 99% or less of an outer diameter of the rotor core.

4. The rotor according to claim 1, wherein
the rotor core includes a plurality of magnet holes in which respective magnets are disposed, and
the plate is provided to cover at least a part of an opening of each of the plurality of magnet holes.

5. The rotor according to claim 1, wherein the material constituting the plate has an electrical resistivity of 74 μΩ·cm or less.

6. The rotor according to claim 5, wherein the material constituting the plate has an electrical resistivity in a range from 26 μΩ·cm to 74 μΩ·cm inclusive.

7. The rotor according to claim 1, wherein the plate is made of an aluminum alloy.

8. The rotor according to claim 1, wherein
the rotor core includes an axial end at which an end plate made of a non-magnetic metal material is disposed, and
the end plate includes an outer edge away from the central axis by a third distance that is shorter than the first distance.

9. The rotor according to claim 8, wherein the plate and the end plate are made of an identical material.

10. A rotary electric machine comprising:
the rotor according to claim 1; and
a stator that faces the rotor with a gap between the stator and the rotor.

11. A drive device comprising:
the rotary electric machine according to claim 10; and
a gear mechanism that is connected to the rotary electric machine.

* * * * *